Dec. 17, 1963  J. F. MONTAGUE  3,114,371
SUPPOSITORY
Filed March 11, 1960

INVENTOR
JOSEPH F. MONTAGUE
BY
Munn Liddy, Daniels & March
ATTORNEYS

United States Patent Office 3,114,371
Patented Dec. 17, 1963

3,114,371
SUPPOSITORY
Joseph F. Montague, 104 E. 40th St., New York, N.Y.
Filed Mar. 11, 1960, Ser. No. 14,354
8 Claims. (Cl. 128—271)

The present invention relates to a novel suppository, and more particularly it pertains to a type of suppository which can effect relatively deep penetration within the anal cavities of the animal or human body without the assistance of instruments and the like.

At the present time many of the suppositories being self-administered are not capable of deep penetration within the anal passage, e.g., about 4–5", without the use of instruments. For certain medical treatments, it is desirable that the suppository be made to penetrate farther than is possible heretofore without the use of instruments. The ease with which this can be accomplished is important, because it will have an important bearing on the way the public will accept the suppository. Upon considering the various difficulties attendant to this problem, it was apparent that the suppository should be preferably one that not only can be self-administered, but it should be effected with little or no discomfort to the user. The present invention meets all the requirements which appear essential to public acceptance of a suppository having the characteristics described above.

Another disadvantage of prior art suppositories is that as they are intended for insertion without the use of instruments, they are generally unreliable since it entails manually inserting the suppository through the anal passage. As a general rule deep penetration is not achieved and the medicinal effect of the suppository is to a great extent dissipated. In addition, with many users of suppositories unless deep penetration is achieved the suppository has a tendency to quickly work free of the anal passage, in other words be expelled.

In view of the foregoing an object of this invention is to provide a suppository which can penetrate the anal canal and enter the rectal cavity of the human or animal body to a greater extent than heretofore without the use of instruments.

Another object of the invention is to provide a suppository which can be used without discomfort to the person or animal being treated.

A further object of this invention is to provide a suppository which need be only slightly inserted within an anal canal of the human or animal body and which will then be self propelled to a depth of approximately 4–5" within the anal canal of the rectal cavity.

Yet another object of the invention is to provide a suppository which is coated with a non-toxic gas producing material, which upon contact with moisture in the cavity undergoes reaction with consequent release of gas, the release of the gas propelling the suppository to a depth of approximately 4–5" in the cavity.

These and further objects and advantages of the invention will become apparent from the following detailed description of the invention to be read in conjunction with the accompanying drawings wherein like components in the several views are identified by the same reference numeral.

Figure 1:
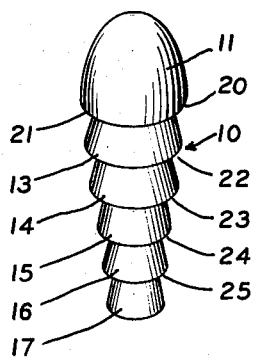
FIGURE 1 is a perspective of the suppository of the present invention, the suppository being shown prior to the addition of a non-toxic gas producing solid material within the grooves of the suppository.

The suppository of the present invention contains a rounded or bullet shaped head to ease penetration. In some cases, the head may be differently shaped and still come within the scope of the present invention. In such cases, if desired, the head may be non-circular, but from the standpoint of optimum performance, it is preferred that the head be bullet shaped. The body portion of the suppository is elongated and preferably circular in cross-section with the cross-sectional area being reduced gradually in the direction of the unattached end of the body portion. The body portion of the suppository contains at least one groove and preferably this groove is annular. The groove has a depth which is greater in the direction of the head of the suppository, and in this way a shoulder is formed against which a thrust or force may be exerted for propulsion of the suppository in the direction of its head. The groove contains a non-toxic gas-producing solid material, which upon contact with moisture in the cavity, undergoes reaction with consequent release of gas. The escape of the gas towards the tail end of the suppository causes the same to be slowly propelled forward.

The suppository may be composed of materials which are currently being used for that purpose. Gelatin is a common material. The medication is contained within the suppository, and this may be anything which is being prescribed for treatment. The gas-producing solid material should be non-toxic and one which will, upon contact with moisture, produce a non-toxic gas, such as, for example, carbon dioxide.

Sodium bicarbonate potassium bitantrate mixture is also suitable for this purpose.

Referring now to the drawings, the suppository 10 contains a bullet-shaped head 11 and a body 12. The body 12 is composed of five elements 13, 14, 15, 16 and 17, each of which is generally frusto conically shaped, but arranged in decreasing order of size with the top of each attached to the base of the adjacent element, except that the first element 13 has its top 18 attached to the head 11, and the last element 17 has its base unattached. It will be noted that the base 19 of element 13 is smaller in size than the base 20 of the head 11. The attachment of the top of each element of the base of the adjacent element forms the annular grooves 21, 22, 23, 24 and 25. Each groove is filled with effervescent or non-toxic gas forming solid material shown as numerals 26, 27, 28, 29 and 30. With the effervescent material contained in the grooves, the configuration of the suppository is that shown in FIGURE 2. The body 12 appears as an elongated member which is circular in cross-sectional area and reduces gradually in cross-section in the direction of the tail thereof.

Granular efferescent material may be compacted within the grooves 21 through 25 inclusive and contained therein by means of a suitable binder such as a vegetable gum, e.g., gum arabic or any other suitable pharmaceutical binder. If desired, a layer or covering of gelatin may encase the entire suppository and thus contain the effervescent material within the grooves.

Figure 2:
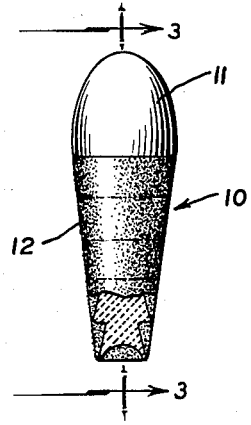
FIGURE 2 is a view similar to FIGURE 1, but in front elevation and after a non-toxic gas producing solid material has been applied within the grooves of the suppository, a portion of the view being broken away in order to illustrate structural details.

Alternatively, the suppository may comprise the general configuration of FIGURE 2, but instead of having the elements 13 through 17 inclusive make up the grooves as aforementioned, the suppository may contain nonannular grooves at various parts of its body 12 which have the cross-section shown in FIGURE 1, and are filled with effervescent material.

Figure 3:
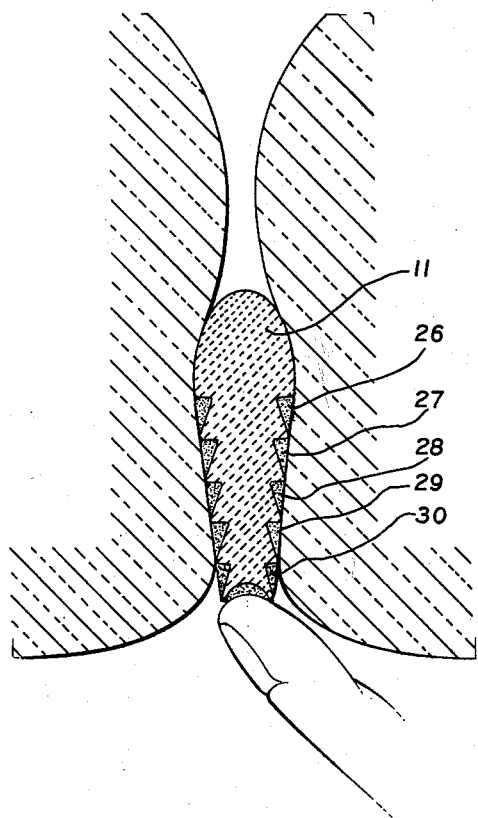
FIGURE 3 is a cross-section taken on the line 3—3 of FIGURE 2 and illustrating the suppository of the present invention being inserted within the anal vent.
Figure 4:
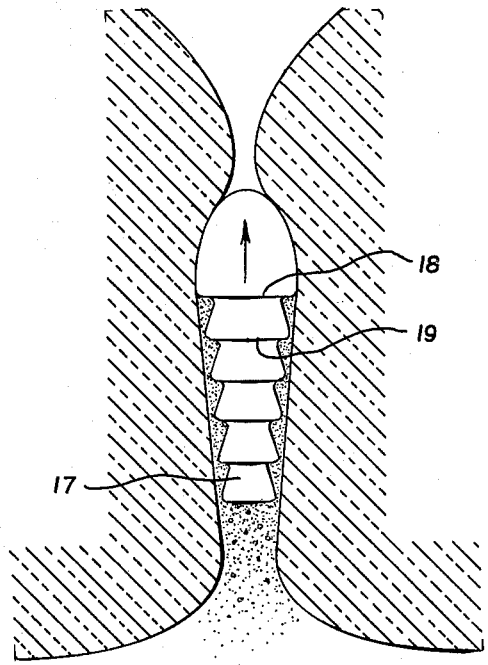
FIGURE 4 is a view similar to FIGURE 3 and illustrating the suppository of the present invention being self propelled within the anal vent after the non-toxic gas producing solid material has come into contact with any moisture.

In use the suppository of the present invention is manually inserted in the anal opening as illustrated in FIGURE 3. As the suppository is inserted in the anal opening the moisture therein contacts the effervescent material which undergoes reaction with consequent release of gas. Due to the configuration of the suppository and the tight fit between the outer surface of the head of the suppository and the walls of the anal opening the pressure generated by the expansion of the gas is diverted toward the opening in the anal vent. The equal and opposite force produced by the escape of the gas acts on the base of each element and insures the suppository to move forward in the anal vent. When the suppository has been propelled to a depth of approximately 4–5″ within the anal vent the gas has been completely dissipated. When the suppository is wetted before insertion, increased propulsion action is obtained.

What has been described is a suppository which requires only slight manual penetration within an anal cavity of the human or animal body, and which is then capable of propelling itself to a depth of approximately 4–5″. It is to be understood that although a preferred embodiment of the invention has been described changes and modifications may be made thereto without departing from the invention except as limited by the scope of the appended claims.

What I claim is:

1. A suppository comprising in combination a head having a top and a base, a body attached to the head comprising at least one generally frusto conically shaped element having the top thereof attached to the base of said head and the base of said element being of smaller dimension than the base of said head, thus forming an angular groove between said head and said body, and a non-toxic gas producing solid material contained within the groove, whereupon insertion of the suppository into the anal passageway effects a reaction between the moisture in said passageway and the gas producing material within said groove to generate a gas, the liberation of which effects reaction force on the base of said head to assist the penetration of the said suppository into the anal passageway.

2. A self-propelling suppository comprising in combination a head having a top and a base, a body attached to the base of said head comprising at least one generally frusto conically shaped element having the top thereof attached to the base of said head, and the base of said element being of smaller dimension than the base of said head to define an angular groove between said head and said body, and a non-toxic gas producing solid material contained within said groove, said body being further characterized in that it contains more than one element, the element furthest removed from said head contains a base of smaller dimension that the base of the next adjacent element which is closer to said head so that insertion of the suppository into an anal passageway effects a reaction between the moisture therein and the gas producing material to generate a gas, the liberation of the gas creating a thrust reaction against the bases of said head and each of said elements to assist the peneration of the suppository into an anal passageway.

3. A self-propelling suppository comprising a bullet-shaped head, an elongated circular body attached to said head, said body having the cross-section thereof reduced gradually in size in the direction of the unattached end thereof, said body containing at least one groove with the depth thereof being greater in the direction of said head than in the direction of said unattached end of said body, and a non-toxic gas producing solid material contained in the groove so that upon insertion of said suppository into the anal passageway the moisture within the anal passageway reacts with the gas producing material to generate a gas, the liberation of which effects a thust reaction at the base of the groove to assist the penetration of said suppository into the anal passageway.

4. A suppository comprising a bullet-shaped head, an elongated body attached to said head, said body having the cross-section thereof reduced gradually in the direction of the unattached end thereof, said body containing at least one angular groove with the depth thereof being greater in the direction of the head, and a non-toxic gas producing solid material contained in the groove, so that upon insertion of said suppository into the anal passageway the moisture within the anal passageway reacts with the gas producing material to generate a gas, the liberation of which from said groove effecting a thrust reaction on the base of said groove to assist the penetration of said suppository into the anal passageway.

5. The suppository as defined in claim 4 being further characterized by said body contains a series of spaced angular grooves, each of said grooves being filled with a non-toxic gas producing material.

6. A self-propelling gelatinous suppository comprising a bullet-shaped head, an elongated circular body attached to said head and having a cross-section thereof reduced gradually in the direction of the unattached end thereof, said body containing a series of angular grooves, each groove having its depth greater in the direction of said head, and a non-toxic gas producing solid material contained within each of said grooves so that upon insertion of said suppository into an anal passageway the moisture within the passageway reacts with the gas producing material disposed within each of the grooves to generate a gas the liberation of which from said groove effecting a thrust reaction against the bottom of the respective grooves which assist the penetration of said suppository into the anal passageway.

7. A suppository comprising a body having a head portion and an end portion, said head portion having a cross sectional area greater than that of the end portion, and said head portion being sized so as to be snugly engaged by the walls of an anal passageway, said body portion having formed therein a series of grooves between the head and end portion thereof, each of said grooves opening toward the end portion of said body, and a non-toxic gas producing material contained within said grooves so that upon insertion of said suppository into the anal passageway, the moisture of the anal passageway reacts with the gas producing material to generate a gas, the liberation of which through the rearwardly directed groove openings effects a thrust reaction on the bottom of the respective grooves to assist the penetration of said suppository into the anal passageway.

8. The invention as defined in claim 7, and including a layer of gelatin encasing the suppository and the gas-producing material disposed in said grooves.

References Cited in the file of this patent

FOREIGN PATENTS

| 459,327 | Great Britain | Jan. 6, 1937 |
| 514,500 | Great Britain | Nov. 9, 1939 |